(12) United States Patent
Woo et al.

(10) Patent No.: US 9,116,281 B2
(45) Date of Patent: Aug. 25, 2015

(54) COMPLEX OPTICAL FILM AND LIGHT SOURCE ASSEMBLY INCLUDING THE SAME

(71) Applicant: SHINWHA INTERTEK CORP., Cheonan-si, Chungcheongnam-do (KR)

(72) Inventors: Jin-Tae Woo, Chungju-si (KR); Jae-Soon Lee, Cheongju-si (KR); Min-cheol Kook, Yongin-si (KR); Jong-Yoon Lim, Cheonan-si (KR); Sung-Keun Kim, Gunsan-si (KR); Il-ho Jeon, Sejon-si (KR); Yong-Jun Choi, Gunpo-si (KR)

(73) Assignee: SHINWHA INTERTEK CORP., Cheonan-si, Chungcheongnam-do (KR)

( * ) Notice: Subject to any disclaimer, the term of this patent is extended or adjusted under 35 U.S.C. 154(b) by 0 days.

(21) Appl. No.: 14/270,682

(22) Filed: May 6, 2014

(65) Prior Publication Data

US 2014/0340911 A1    Nov. 20, 2014

(30) Foreign Application Priority Data

May 15, 2013   (KR) .................. 10-2013-0055228
Jun. 19, 2013   (KR) .................. 10-2013-0070375

(51) Int. Cl.
*G02B 5/02* (2006.01)
(52) U.S. Cl.
CPC ............ *G02B 5/0242* (2013.01); *G02B 5/0215* (2013.01); *G02B 5/0221* (2013.01); *G02B 5/0231* (2013.01)
(58) Field of Classification Search
CPC .... G02B 6/005; G02B 6/0088; G02B 6/0036; G02B 6/0055; G02B 6/0053; G02B 6/0031; G02B 6/0035; G02B 6/0073; G02B 6/0051; G02B 6/0065; G02B 6/0068; G02B 6/0033; G02B 6/0043; G02B 6/0081

USPC .................................................. 362/600–634
See application file for complete search history.

(56) References Cited

U.S. PATENT DOCUMENTS

2009/0237595 A1*   9/2009   Kanaya et al. ................... 349/64
2009/0311486 A1*  12/2009   Kim et al. ...................... 428/172
(Continued)

FOREIGN PATENT DOCUMENTS

KR     2007-0054582 A   5/2007
KR     2010-0061357 A   6/2010
(Continued)

OTHER PUBLICATIONS

Office Action dated Nov. 21, 2013 issued by the Korean Patent Office corresponding to Application No. 10-2013-0070375 with English translation.

(Continued)

*Primary Examiner* — William Carter
(74) *Attorney, Agent, or Firm* — Kratz, Quintos & Hanson, LLP (57) ABSTRACT

Provided are a complex optical film and a light source assembly including the same. The complex optical film includes a first substrate, a light shielding layer formed on a bottom surface of the first substrate, an optical pattern layer formed on a top surface of the first substrate and including concavo-convex portions, a second substrate disposed on the first substrate, and a first adhesive layer disposed under the second substrate, wherein the light shielding layer includes a binder and organic particles and inorganic particles dispersed in the binder, the convex portions of the optical pattern layer at least partially penetrate into the first adhesive layer to be combined with the first adhesive layer, and a low-refraction area having a lower refractive index than the optical pattern layer and the first adhesive layer is defined between the first adhesive layer and the optical pattern layer.

17 Claims, 9 Drawing Sheets

(56) References Cited

U.S. PATENT DOCUMENTS

| | | |
|---|---|---|
| 2011/0032178 A1 | 2/2011 | Lee .................................. 345/87 |
| 2011/0096402 A1 | 4/2011 | Sun et al. ....................... 359/599 |
| 2013/0010234 A1* | 1/2013 | Sung et al. ....................... 349/95 |

FOREIGN PATENT DOCUMENTS

| | | |
|---|---|---|
| KR | 2010-0118490 A | 11/2010 |
| KR | 10-1144648 A | 5/2012 |
| KR | 101253555 B1 | 4/2013 |
| TW | 201115177 A1 | 5/2011 |
| TW | 201124276 A1 | 7/2011 |

OTHER PUBLICATIONS

Notice of Allowance dated Mar. 20, 2014 issued by the Korean Patent Office corresponding to Application No. 10-2013-0070375 with English translation.

Office Action dated Mar. 13, 2015 issued by the TIPO for Taiwanese Patent Application No. 103116897.

* cited by examiner

COMPLEX OPTICAL FILM AND LIGHT SOURCE ASSEMBLY INCLUDING THE SAME

CROSS-REFERENCE TO RELATED APPLICATION

This application claims priority from Korean Patent Application No. 10-2013-0055228 filed on May 15, 2013 in the Korean Intellectual Property Office and Korean Patent Application No. 10-2013-0070375 filed on Jun. 19, 2013 in the Korean Intellectual Property Office, and all the benefits accruing therefrom under 35 U.S.C. 119, the contents of which in its entirety are herein incorporated by reference.

BACKGROUND

1. Field of the Invention

The present invention relates to a complex optical film, and more particularly to a complex optical film adopted to a display and a light source assembly including the same 2. Description of the Related Art A liquid crystal display (LCD) device includes two panels having a plurality of electrodes and a liquid crystal layer interposed between the two panels. a LCD device displays images by adjusting the amount of light transmitted therethrough by applying a voltage to the plurality of electrodes so that liquid crystal molecules of the liquid crystal layer can be rearranged.

A LCD device is not a self light-emitting device, and thus, it needs a light source assembly. Light source assemblies used in the LCD are largely classified into two types: an edge type light source assembly and a direct type light source assembly. In some edge type light source assemblies, a light guide plate is provided to make the light emitted from a light source to be upwardly irradiated, and at least one optical sheet is provided above the light guide plate to adjust optical properties of the light having passed the light guide plate. In some direct type light source assemblies, a diffusion plate is provided to reduce a bright line of the light emitted from a light source, and at least one optical sheet is provided to adjust optical properties of the light having passed the diffusion plate.

In the direct type light source assembly, a diffusion plate and a plurality of optical sheets are required to shield light and accurately control optical properties, which increases a thickness of the light source assembly and makes the manufacturing process complicated, resulting in an increase in the manufacturing cost.

SUMMARY

The present invention provides a complex optical film, which has an excellent light shielding characteristic while effectively achieving various optical modulating characteristics.

The present invention also provides a light source assembly, which has excellent brightness and light shielding characteristics and a reduced thickness and encounters no issue of abrasion resistance due to friction between sheets while providing an integrated single complex optical film to a light source without using a diffusion plate.

These and other objects of the present invention will be described in or be apparent from the following description of the preferred embodiments.

According to an aspect of the present invention, there is provided a complex optical film includes a first substrate, a light shielding layer formed on a bottom surface of the first substrate, an optical pattern layer formed on a top surface of the first substrate and including concavo-convex portions, a second substrate disposed on the first substrate, and a first adhesive layer disposed under the second substrate, wherein the light shielding layer includes a binder and organic particles and inorganic particles dispersed in the binder, the convex portions of the optical pattern layer at least partially penetrate into the first adhesive layer to be combined with the first adhesive layer, and a low-refraction area having a lower refractive index than the optical pattern layer and the first adhesive layer is defined between the first adhesive layer and the optical pattern layer.

According to another aspect of the present invention, there is provided a light source assembly including a receiving container, at least one light source received in the receiving container, and a complex optical film received in the receiving container and spaced apart from a top portion of the light source.

According to the embodiments of the present invention, at least the following effects can be provided.

That is to say, in the complex optical film and the light source assembly including the same according to the present invention, a high light shielding characteristic and a high brightness characteristic can be effectively demonstrated just by using a single complex optical film without using a diffusion plate.

In addition, the light source assembly uses only a single complex optical film without using a diffusion plate, thereby simplifying an assembling process.

Further, since the light source assembly includes only a single complex optical film without using a diffusion plate or other optical sheets, there is no probability of occurrence of abrasion due to a contact between different kinds of sheets or plates. Therefore, an issue of abrasion resistance may not be encountered and the degree of freedom in selecting materials may increase.

BRIEF DESCRIPTION OF THE DRAWINGS

The above and other features and advantages of the present invention will become more apparent by describing in detail preferred embodiments thereof with reference to the attached drawings in which:

FIGS. 11 and 12 are sectional SEM photographs of diffusion patterns according to some embodiments of the present invention.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the thickness of layers and regions are exaggerated for clarity.

It will be understood that when an element or layer is referred to as being "on" another element or layer, it can be directly on or connected to the other element or layer or intervening elements or layers may be present. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated components, but do not preclude the presence or addition of one or more other components.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in one of the figures is turned over, elements described as "below" or "beneath" other elements would then be oriented "above" the other elements. Therefore, the exemplary terms "below" or "beneath" can, therefore, encompass both an orientation of above and below. The elements may be aligned in different directions. Accordingly, the spatially relative terms may be interpreted according to the alignment.

The term "~film" used herein may also be used to mean "~sheet" or "~plate".

Hereinafter, embodiments of the present invention will be described with reference to the accompanying drawings.

Figure 1:
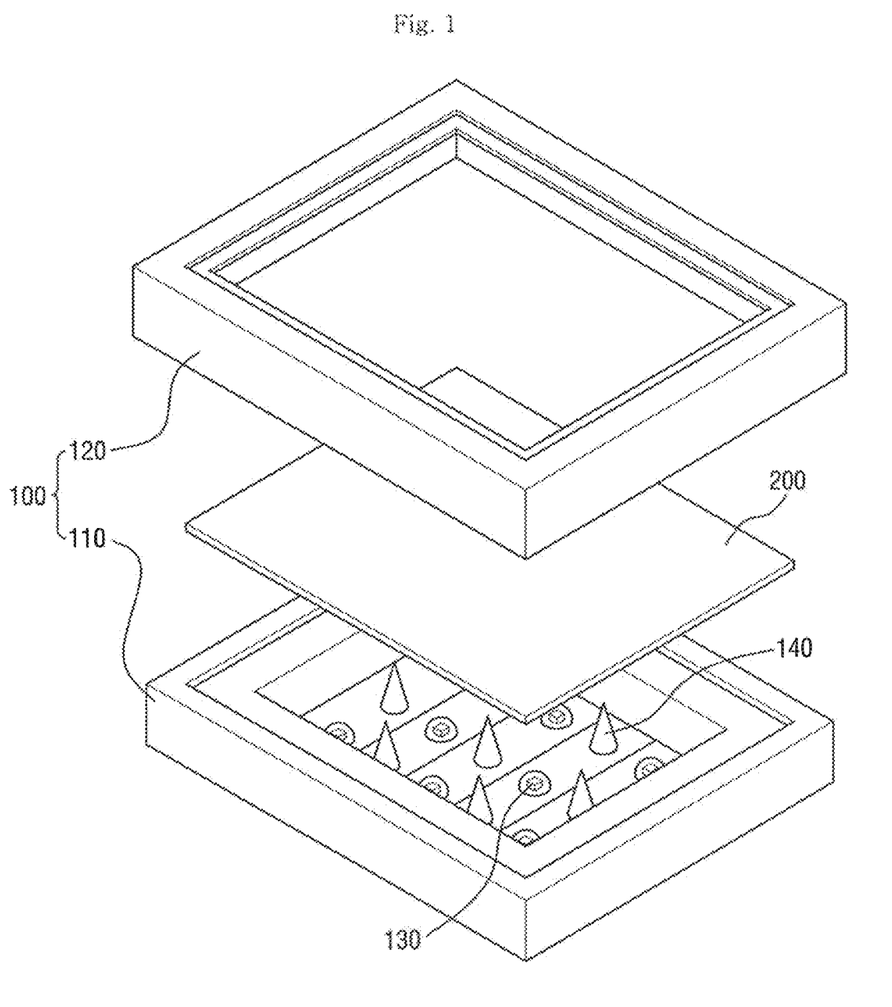
FIG. 1 is an exploded perspective view of a light source assembly according to an embodiment of the present invention.
Figure 2:
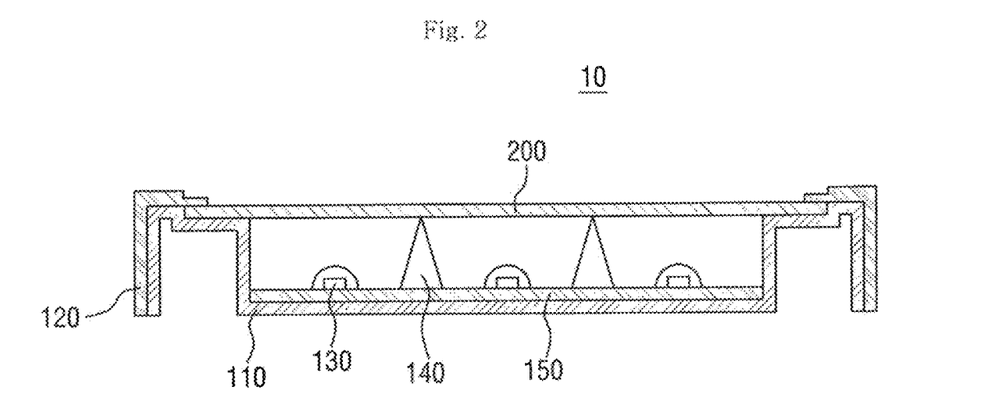
FIG. 2 is a cross-sectional view of a light source assembly according to an embodiment of the present invention.
Figure 3:
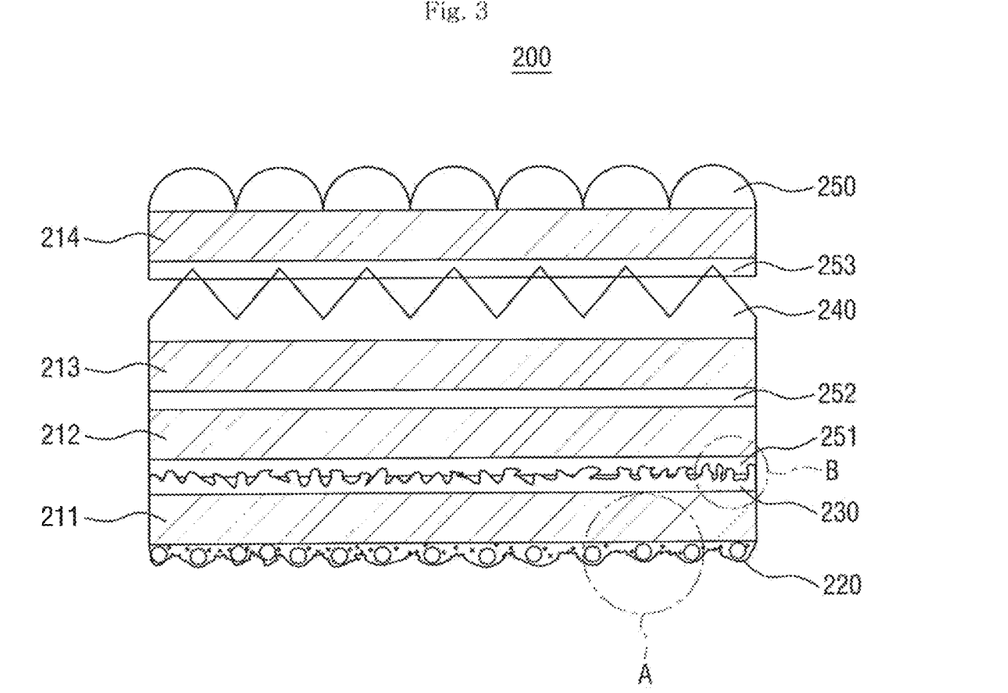
FIG. 3 is a cross-sectional view of a complex optical film according to an embodiment of the present invention.
Figure 4:
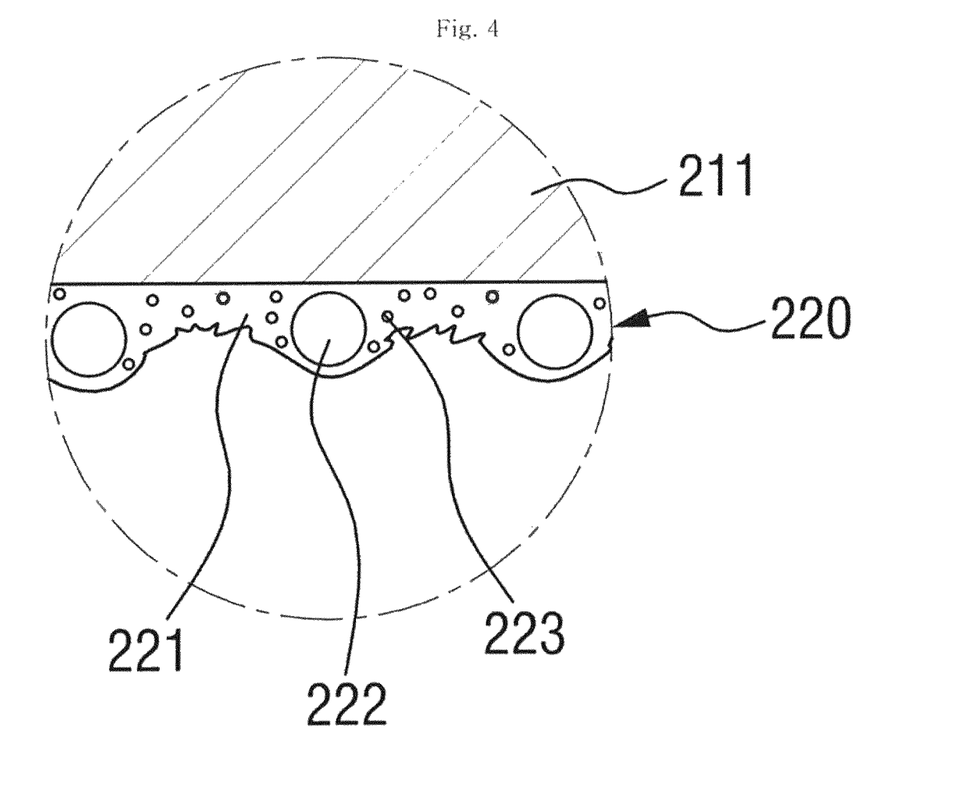
FIG. 4 is an enlarged view of a region 'A' of FIG. 3.
Figure 5:
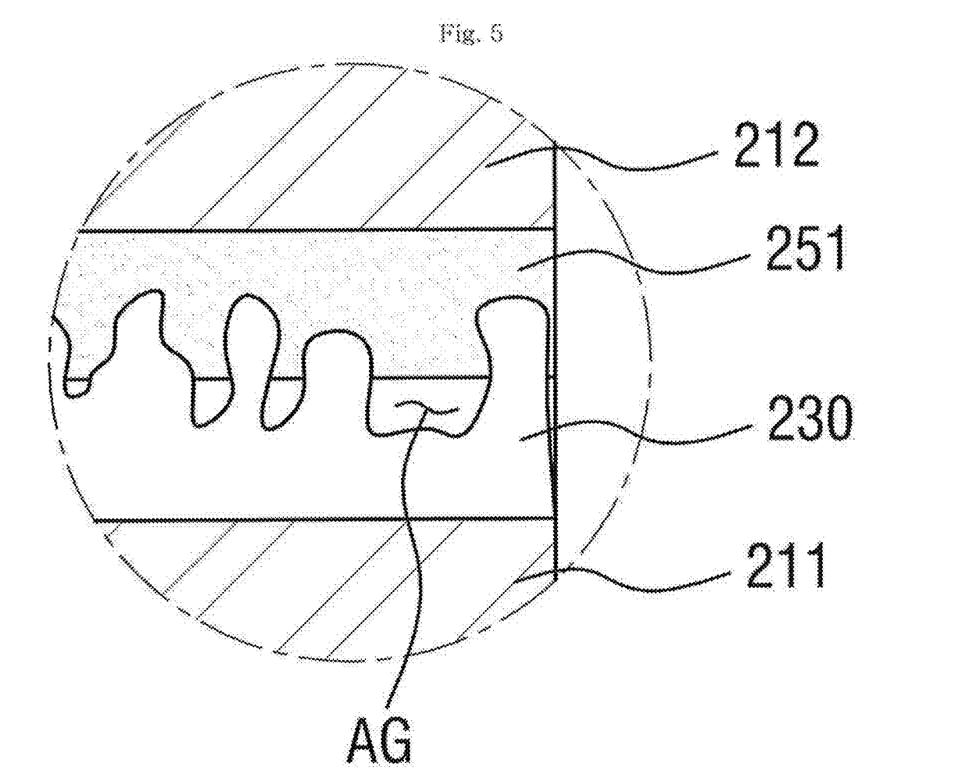
FIG. 5 is an enlarged view of a region 'B' of FIG. 3.

FIG. 1 is an exploded perspective view of a light source assembly according to an embodiment of the present invention, FIG. 2 is a cross-sectional view of a light source assembly according to an embodiment of the present invention, FIG. 3 is a cross-sectional view of a complex optical film according to an embodiment of the present invention, FIG. 4 is an enlarged view of a region 'A' of FIG. 3, and FIG. 5 is an enlarged view of a region 'B' of FIG. 3.

Referring to FIGS. 1 to 5, the light source assembly 10 according to an embodiment of the present invention includes a receiving container 100, at least one light source 130 received in the receiving container 100, and a complex optical film 200 received in the receiving container 100 and disposed over the at least one light source 130 to be spaced apart from the at least one light source 130.

The receiving container 100 receives the at least one light source 130 and the complex optical film 200. The receiving container 100 may include a bottom chassis 110 and a middle mold 120.

The bottom chassis 110 may include a bottom surface formed in a substantially rectangular shape and sidewalls formed vertically from sides of the bottom surface. A mounting platform on which the complex optical film 200 is mounted is provided on the sidewall of the bottom chassis 110. In the illustrated embodiment, the mounting platform is formed on an upper portion of the sidewall of the bottom chassis 110 in the form of a protruded platform. Alternatively, a top end of the bottom chassis 110 may be entirely planarized to function as a mounting platform. A portion of the sidewall of the bottom chassis 110 may upwardly extend from the mounting platform to then be downwardly bent.

A reflective sheet 150 may be disposed on the bottom surface of the bottom chassis 110. In addition, a sheet support protrusion 140 may also be disposed on the bottom surface of the bottom chassis 110. The sheet support protrusion 140 functions to prevent the complex optical film 200 from convexly warping or sagging.

The middle mold 120 may have a rectangular window frame including a centrally formed opening window. The middle mold 120 may be coupled to the bottom chassis 110 to then be fixed. The middle mold 120 may include a protruding part that inwardly protrudes. An LCD may be mounted on a top end of the protruding part of the middle mold 120.

At least one light source 130 may be disposed on the bottom surface of the bottom chassis 110. For example, light emitted diodes (LEDs), cold cathode fluorescent lamps (CCFLs), hot cathode fluorescent lamps (HCFLs), and external electrode fluorescent lamps (EEFLs) may be used as the light sources 130. In the illustrated embodiment, LEDs are provided by way of example of the light sources 130.

The plurality of light sources 130 may be disposed to be spaced apart from each other. When the plurality of light sources 130 are LEDs as point light sources, the respective LEDs may be arranged according to a rule in which they are regularly arranged in row and column directions. For example, the LEDs may be equidistantly arranged in the row and column directions or may be arranged in three rows and different numbers of LEDs may be arranged in each row, for example, 5 in the first row, 7 in the second row and 6 in the third row, but aspects of the present invention are not limited thereto.

The complex optical film 200 may be interposed between the mounting platform of the bottom chassis 110 and the protruding part of the middle mold 120. The protruding part of the middle mold 120 may prevent the complex optical film 200 from moving by pressing edges of the complex optical film 200 disposed thereunder. In addition, the top end of the sheet support protrusion 140 may come into contact with a bottom surface of the complex optical film 200.

The light sources 130 and the complex optical film 200 may be disposed to be spaced apart from each other. An air gap layer may be interposed between the light sources 130 and the complex optical film 200. In the present embodiment, the complex optical film 200 has a high light shielding characteristic in itself. Accordingly, a diffusion plate or a separate shielding layer or a shielding structure, such as a diffusion plate, may not intervene between the light sources 130 and the complex optical film 200. That is to say, the complex optical film 200 may directly face the light sources 130 with only an air gap layer intervening between the light sources 130 and the complex optical film 200.

The complex optical film 200 may include a plurality of substrates. The respective substrates may be bonded or adhered to each other or may be integrated with each other with a resin layer interposed therebetween. Accordingly, the complex optical film 200 may be integrated.

An optical modulation layer or a light shielding layer may be formed on top and bottom surfaces of each substrate. Each optical modulation layer may be a prism layer, a microlens layer, a renticular layer, etc. The complex optical film 200 is a single integrated sheet and demonstrates at least one optical modulating characteristic and light shielding characteristic while serving as a support body. Therefore, even when only one integrated complex optical film 200 is employed to a direct-type light source assembly without another light shielding layer, light shielding structure or other sheets, optical properties, such as a light shielding, focusing or diffusing property, and mechanical characteristics can be fully demonstrated.

Hereinafter, the complex optical film according to an embodiment of the present invention 200 will be described in more detail. The illustrated complex optical film 200 includes a first substrate 211, a second substrate 212, a third substrate 213, and a fourth substrate 214. The respective substrates 211 to 214 may be made of transparent plastic materials. For example, the respective substrates 211 to 214 may include polycarbonate-based, polysulfone-based, polyacrylate-based, polystyrene-based, polyvinyl chloride-based, polyvinyl alcohol-based, polynorbornene-based, and polyester-based materials. In some exemplary embodiments, all of the first substrate 211, the second substrate 212, the third substrate 213, and the fourth substrate 214 may be made of polyethylene phthalate (PET).

The respective substrates 211 to 214 may have a thickness in a range of 50 to 500 µm. In an exemplary embodiment, all of the respective substrates 211 to 214 may have a thickness of approximately 125 µm. In another exemplary embodiment, at least one of the respective substrates 211 to 214 may have a thickness of approximately 250 µm.

A light shielding layer 220 is formed on a bottom surface of the first substrate 211. The light shielding layer 220 is positioned at the bottommost portion of the complex optical film 200 to scatter incident light, thereby attenuating bright portions and dark portions.

The light shielding layer 220 may include a binder 221, organic particles 222 and inorganic particles 223 dispersed in the binder 221. Here, the organic/inorganic particles may mean organic/inorganic beads, fillers, or the like. The organic/inorganic particles may have fixed-shapes, such as spherical shapes, flat-panel shapes or core-shell shapes, or may be shapeless particles. Alternatively, the organic/inorganic particles may include particles of various shapes.

The organic and inorganic particles 222 and 223 may be dispersed throughout the light shielding layer 220. The inorganic particles 223 may be dispersed in convex and concave parts of the light shielding layer 220. The organic particles 222 may be mainly positioned in the convex parts of the light shielding layer 220, but aspects of the present embodiment are not limited thereto. That is to say, the organic particles 222 may also be positioned in the concave parts of the light shielding layer 220. In some embodiments, the organic and inorganic particles 222 and 223 may be randomly dispersed throughout the light shielding layer 220 and may be dispersed in a substantially uniform density.

The organic particles 222 may have an average particle size (an average diameter in a case of spherical organic particles) in a range of approximately 1 to approximately 40 µm. In some non-limiting embodiments of the present invention, the average particle size of the organic particles 222 may be in a range of 1.5 to 10 µm. In other embodiments, the average particle size of the organic particles 222 may be in a range of 2 to 6 µm.

The inorganic particles 223 may have a smaller average particle size than the organic particles 222. If the average particle size of the inorganic particles 223 is greater than that of the organic particles 222, a brightness characteristic of the complex optical film 200 may be lowered. Meanwhile, if the average particle size of the inorganic particles 223 is too small, the light shielding characteristic of the complex optical film 200 may be lowered. In addition, if the average particle size of the inorganic particles 223 is too small, the dispersing property of the inorganic particles 223 in the light shielding layer 220 may be lowered. In this regard, the inorganic particles 223 may have an average size in a range of approximately 50 nm to approximately 2 µm. In some embodiments, the average size of the inorganic particles 223 may be in a range of approximately 100 nm to approximately 400 nm. In some other embodiments, the average size of the inorganic particles 223 may be in a range of approximately 150 nm to approximately 300 nm.

In some embodiments, the organic particles 222 may have various sizes, and 95% or more of the organic particles 222 may have a size in a range of approximately 1 to approximately 20 µm. In addition, 70% % or more of the organic particles 222 may have a size in a range of approximately 2 to approximately 4 µm.

In addition, the inorganic particles 223 may have various sizes, and 95% or more of the inorganic particles 223 may have a size in a range of approximately 50 nm to approximately 2 µm. In addition, 70% % or more of the inorganic particles 223 may have a size in a range of approximately 100 nm to approximately 400 nm.

Examples of materials forming the organic particles 222 may include melanin. Examples of materials forming the inorganic particles 223 may include titanium dioxide ($TiO_2$). However, examples of the materials forming the organic particles 222 and the inorganic particles 223 are not limited to those stated above.

A content ratio of the organic particles 222 to the inorganic particles 223 may be in a range of approximately 1:1 to approximately 10:1. In some embodiments, the content ratio of the organic particles 222 to the inorganic particles 223 may be in a range of approximately 2:1 to approximately 4:1. In some non-limiting embodiments, assuming that a total of the organic particles 222 and the inorganic particles 223 is 100%, the content of the organic particles 222 may be approximately 75% and the content of the inorganic particles 223 may be approximately 25%.

A content ratio of a total of the organic particles 222 and the inorganic particles 223 to solid matter may be in a range of 1:0.4 to 1:0.6.

The light shielding layer 220 may be formed by coating a composition including the organic particles 222 and the inorganic particles 223 dispersed in the binder 221 on the bottom surface of the first substrate 211. In the illustrated embodiment, the coating is gravure printing, but aspects of the present invention are not limited thereto.

Figure 6:
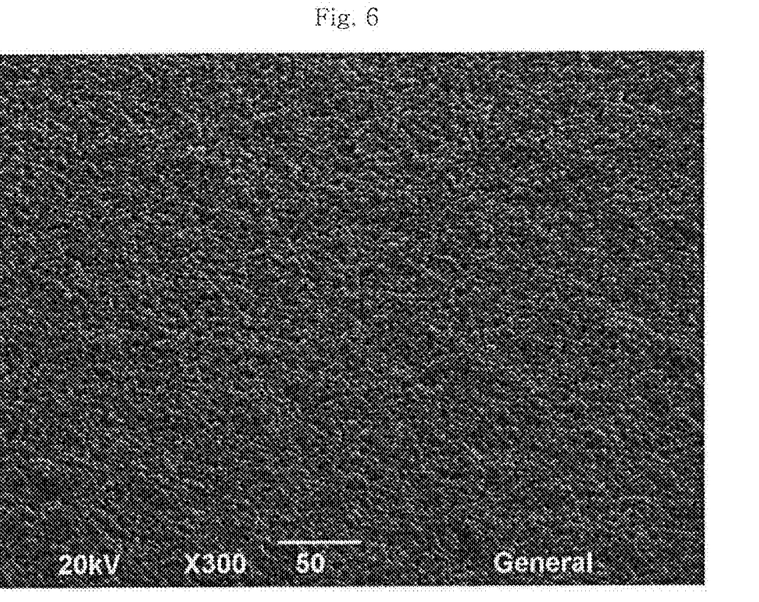
FIGS. 6 and 7 are SEM photographs of light shielding layers according to some embodiments of the present invention.
Figure 7:
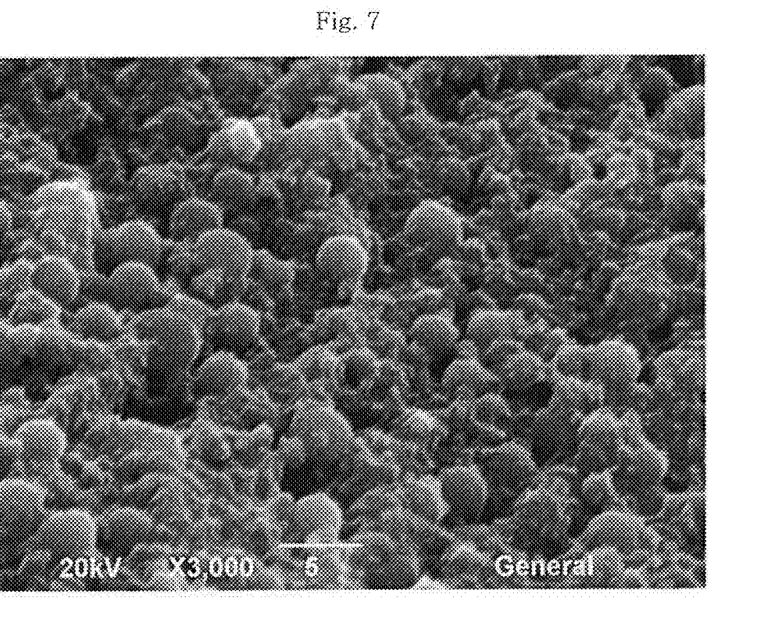
Figure 8:
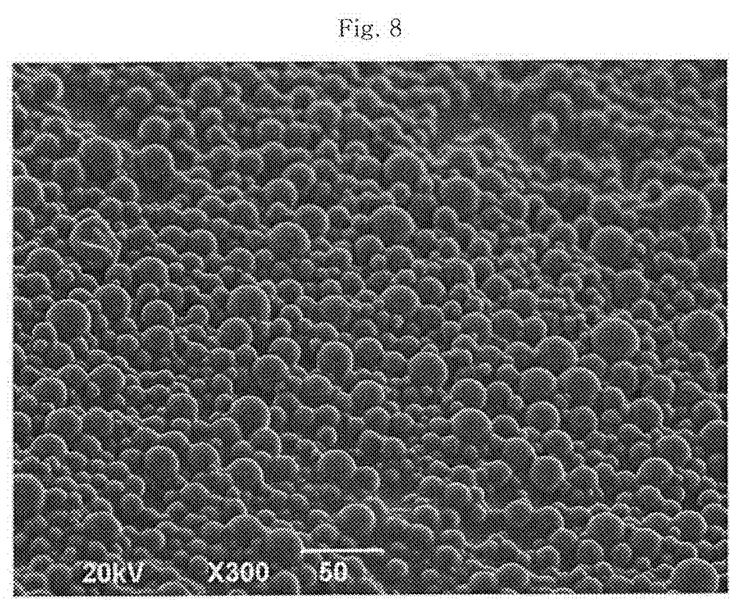
FIG. 8 is an SEM photograph of a general diffusion layer.

FIGS. 6 and 7 are SEM photographs of light shielding layers according to some embodiments of the present invention. FIG. 8 is an SEM photograph of a general diffusion layer, which is obtained by gravure printing a composition including only organic particles without using inorganic particles.

While the general diffusion layer has a smooth surface, as shown in FIG. 8, the light shielding layer 220 has many fine irregularities throughout surfaces of the convex and concave parts, as shown in FIGS. 6 and 7. In particular, the concave parts have coarser surface than the general diffusion layer, suggesting that high surface roughness. The light shielding layer 220 may demonstrate higher light shielding efficiency than the general diffusion layer due to a difference in surface roughness and presence of inorganic particles 223.

Referring back to FIGS. 1 to 5, an optical pattern layer 230 is formed on a top surface of the first substrate 211. The optical pattern layer 230 may have a non-planar surface, which includes concave parts and convex parts. For example, the optical pattern layer 230 may have a diffusion pattern, a microlens pattern or a prism pattern, but aspects of the present invention are not limited thereto. The optical pattern layer 230 may be shapeless.

A first adhesive layer 251 is formed on a bottom surface of the second substrate 212. The first adhesive layer 251 may be formed to have a thickness in a range of approximately 1 to approximately 10 µm. In addition, the first adhesive layer 251 may have a thickness of approximately 3 µm, for example.

The convex parts of the optical pattern layer 230 of the first substrate 211 may come into contact with the first adhesive layer 251 or may penetrate into the first adhesive layer 251 to then be combined with the second substrate 212. The concave parts of the optical pattern layer 230 of the first substrate 211 are not brought into contact with the first adhesive layer 251 but are spaced apart therefrom. Therefore, a predetermined gap is defined between the first substrate 211 and the second substrate 212, and a low-refraction area may fill the gap. Here, the low-refraction area may mean an area which has a lower refraction index than the optical pattern layer 230 and the first adhesive layer 251. In the following description, an air gap layer AG formed in the gap between the first substrate 211 and the second substrate 212 is illustrated as an example of the low-refraction area, but the low-refraction area is not limited to the air gap layer AG.

The air gap layer AG formed between the first substrate 211 and the second substrate 212 may be in an entirely connected form or may be shaped of multiple islands disconnected from each other according to the shape of the optical pattern layer 230 of the first substrate 211.

The light incident through the light shielding layer 220 is transmitted through the first substrate 211 and the optical pattern layer 230 to then be emitted upwardly. Since a region of the optical pattern layer 230 is surrounded by the first adhesive layer 251 of the second substrate 212, it forms an interfacial surface between the optical pattern layer 230 and the first adhesive layer 251. However, other regions of the optical pattern layer 230 may form an interfacial surface with the air gap layer AG. Light is refracted at the interfacial surface based on a Snell's law. Since the refractive index of the air gap layer AG is smaller than that of the first adhesive layer 251, the light is differently refracted at the region having the first adhesive layer 251 as an interfacial surface and the region having the air gap layer AG as an interfacial surface.

Further, since the optical pattern layer 230 of the first substrate 211 has a non-planar surface, the light is emitted in various directions. Accordingly, as the light is emitted in many directions, bright portions and dark portions may be further attenuated.

Meanwhile, even if the light is emitted from the optical pattern layer 230 of the first substrate 211 to the air gap layer AG, the emitted light will be incident into the first adhesive layer 251 on the bottom surface of the second substrate 212 disposed above the first adhesive layer 251. The light is refracted again at the interfacial surface between the air gap layer AG and the first adhesive layer 251. Here, a traveling direction of the refracted light is parallel with a direction in which the light is directly incident into the first adhesive layer 251 from the optical pattern layer 230 without passing through the air gap layer AG based on the Snell's law.

The final light traveling direction is eventually the same in both cases where the light passes through the air gap layer AG and where the light does not pass through the air gap layer AG. In the former case, however, the light is horizontally shifted. The thicker the air gap layer AG, the more the air gap layer AG is shifted.

Therefore, in order to achieve a high light shielding effect by attenuating bright portions and dark portions, it is advantageous to form the air gap layer AG to have a relatively large thickness between the optical pattern layer 230 formed on the top surface of the first substrate 211 and the first adhesive layer 251 formed on the bottom surface of the second substrate 212.

The thickness of the air gap layer AG may be controlled by a height difference between the convex part and the concave part of the optical pattern layer 230 and a depth in which the convex part of the optical pattern layer 230 penetrates into the first adhesive layer 251.

In detail, the larger the height difference between the convex part and the concave part of the optical pattern layer 230, the larger the thickness of the air gap layer AG. However, when it is assumed that the convex part and the concave part of the optical pattern layer 230 have the same width, too high a height difference between the convex part and the concave part of the optical pattern layer 230 may reduce stiffness of the convex part, thereby resulting in deteriorated mechanical stability, for example, collapse or damages caused to the convex part due to an external force. To avoid this, the widths of the convex part and the concave part of the optical pattern layer 230 may be increased while increasing the height difference between the convex part and the concave part of the optical pattern layer 230. In this case, however, the optical pattern layer 230 may be viewed according to the increase in the average size of patterns. From this point of view, the height difference between the convex part and the concave part of the optical pattern layer 230 may be adjusted in a range between approximately 5 µm and 100 µm. In some embodiments, the height difference between the convex part and the concave part of the optical pattern layer 230 may be in a range of approximately 30 µm and 80 µm.

In addition, as the depth in which the optical pattern layer 230 penetrates into the first adhesive layer 251 is reduced, the thickness of the air gap layer AG may be increased. However, if the depth in which the optical pattern layer 230 penetrates into the first adhesive layer 251 is reduced too much, a binding force between the first substrate 211 and the second substrate 212 may become weakened. Therefore, a depth in which the convex part of the optical pattern layer 230 penetrates into the first adhesive layer 251 may be adjusted to be in a range of approximately 30% to approximately 80% of the thickness of the first adhesive layer 251 or to be approximately 50%. The depth in which the convex part of the optical pattern layer 230 penetrates into the first adhesive layer 251 may be in a range of approximately 0.5 to 10 μm. In some embodiments, the depth in which the convex part of the optical pattern layer 230 penetrates into the first adhesive layer 251 may be in a range of approximately 1 to 7 μm. In some other embodiments, the depth in which the convex part of the optical pattern layer 230 penetrates into the first adhesive layer 251 may be in a range of approximately 2 to 5 μm.

Meanwhile, a relatively large thickness of the air gap layer AG is advantageous in view of light shielding capability. However, if the air gap layer AG has too large a thickness, it is difficult to achieve slimness of the light source assembly 10 and brightness may be reduced due to an extreme horizontal shift of light. Taking the foregoing into consideration, the air gap layer AG may have a maximum thickness in a range of approximately 5 μm to approximately 100 μm. In some embodiments, the air gap layer AG may have a maximum thickness in a range of approximately 30 μm to approximately 80 μm.

Various patterns, including a diffusion pattern, a microlens pattern, a prism pattern and the son on, may be used as the optical pattern layer 230 formed on the top surface of the first substrate 211. SEM photographs showing diffusion patterns as specific examples of patterns to which the optical pattern layer 230 capable of demonstrating a high light shielding capability are illustrated in FIGS. 9 to 12.

Figure 9:
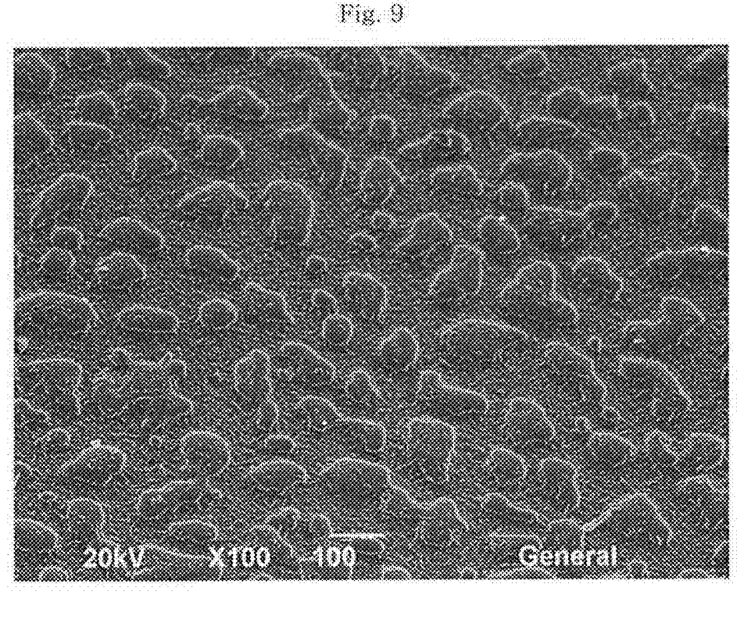
FIGS. 9 and 10 are planar SEM photographs of diffusion patterns according to some embodiments of the present invention.
Figure 10:
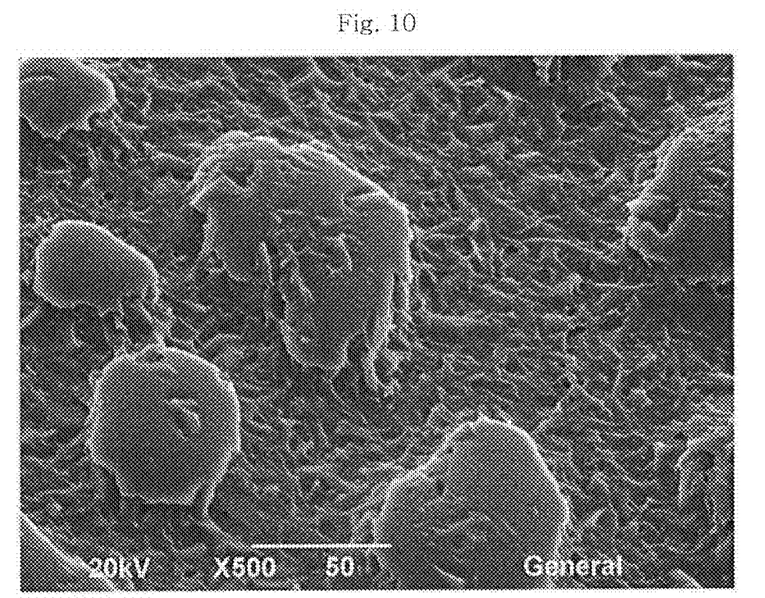
Figure 11:
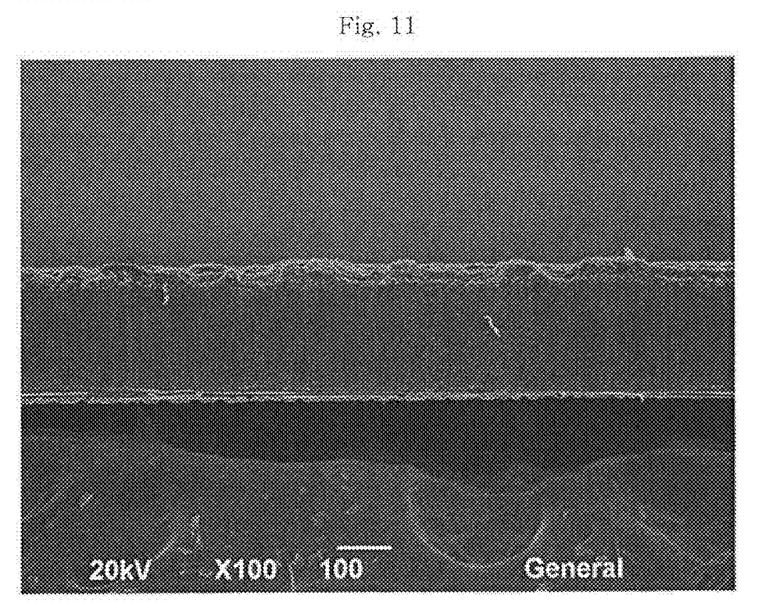

FIGS. 9 and 10 are planar SEM photographs of diffusion patterns according to some embodiments of the present invention, and FIGS. 11 and 12 are sectional SEM photographs of diffusion patterns according to some embodiments of the present invention.

Referring to FIGS. 9 to 12, the diffusion pattern may include concave parts that are relatively recessed and convex parts that are relatively projected, and the concave parts and the convex parts may be randomly sized and arranged. In some embodiments, on a plan view, the concave parts are entirely connected to each other and the convex parts may be separated from each other in multiple islands between the concave parts.

The concave parts and the convex parts may not have smooth surfaces but irregular surfaces. That is to say, even if concave parts or convex parts are wholly formed, fine irregularities may be formed on surfaces of the concave parts or the convex parts.

The surfaces of the convex parts may be shaped such that a plurality of protruding stereoscopic structures are partially overlapped with each other. The protruding stereoscopic structures may have spherical shapes, elliptical shapes, conic shapes. Alternatively, the protruding stereoscopic structures may be shapeless. In addition, the protruding stereoscopic structures may have different shapes from each other.

The diffusion pattern may have higher surface roughness than the light shielding layer 220, but aspects of the present invention are not limited thereto.

The diffusion pattern may be formed by supplying a liquid-phase composition to a mold having a pattern formed therein, followed by curing the resultant structure after or while transferring the resultant structure to the first substrate 211. Alternatively, the diffusion pattern may be formed by supplying a liquid-phase composition to the first substrate 211 to then closely adhering liquid-phase composition layer to a mold or supplying a liquid-phase composition to both of the first substrate 211 and a mold to then be closely adhered to each other, followed by curing the resultant structure after or while transferring the resultant structure.

Referring back to FIGS. 1 to 5, a second adhesive layer 252 is formed on a top surface of the second substrate 212 and comes into contact with a bottom surface of the third substrate 213. The second adhesive layer 252 combines the top surface of the second substrate 212 with the bottom surface of the third substrate 213. A separate optical modulation layer is not provided between the top surface of the second substrate 212 and the bottom surface of the third substrate 213, and the second adhesive layer 252 is interposed therebetween. Accordingly, optical modulating characteristics, such as a focusing, light shielding or diffusing property, may not be demonstrated between the top surface of the second substrate 212 and the bottom surface of the third substrate 213. However, the combining of the second substrate 212 with the third substrate 213 may contribute to increasing the overall stiffness of the complex optical film 200. Since the complex optical film 200 is directly installed on the light sources 130 without a diffusion plate intervening therebetween, it may be easily warped or damaged due to poor stiffness. In addition, optical non-uniformity may be caused to edges of a display, compared to a central portion of the display. The plurality of substrates are firmly combined with each other to increase the stiffness, thereby solving the above-mentioned problems.

In some embodiments, the second adhesive layer 252 may further include diffusing particles. The diffusing particles included in the second adhesive layer 252 may provide additional optical modulating characteristics, such as a viewing angle or light shielding characteristic. The diffusing particles may include organic particles or inorganic particles. A total amount (or a content per unit volume) of the diffusing particles included in the second adhesive layer 252 may be smaller than that of the organic and inorganic particles 222 and 223 included in the light shielding layer 220.

In order to attain a sufficient binding force, a gap between the top surface of the second substrate 212 and the bottom surface of the third substrate 213 may be completely filled with the second adhesive layer 252 and an air gap layer may not be provided between the top surface of the second substrate 212 and the bottom surface of the third substrate 213. In addition, a thickness of the second adhesive layer 252 provided between the second substrate 212 and the third substrate 213 may be greater than that of the first adhesive layer 251 provided on the bottom surface of the second substrate 212. For example, the second adhesive layer 252 provided between the second substrate 212 and the third substrate 213 may have a thickness in a range of approximately 1 to approximately 100 μm. In some embodiments, the thickness of the second adhesive layer 252 may be in a range of approximately 10 to approximately 70 μm. In some other embodiments, the thickness of the second adhesive layer 252 may be in a range of approximately 20 to approximately 50 μm.

In some other embodiments, while reinforcing the stiffness by employing thicker substrates, for example, substrates having a thickness of 250 μm or greater, one of the second substrate 212 and the third substrate 213 may not be provided. In this case, at least one of the second adhesive layer 252 and the first adhesive layer 251 may not be provided.

A first optical modulation layer 240 is formed on the third substrate 213 and a second optical modulation layer 250 is formed on the fourth substrate 214. In the illustrated embodiment, a prism pattern is formed as the first optical modulation layer 240 and a microlens pattern is formed as the second optical modulation layer 250. A third adhesive layer 253 is formed on a bottom surface of the fourth substrate 214. The third adhesive layer 253 formed on the bottom surface of the fourth substrate 214 and the first adhesive layer 251 formed on the bottom surface of the second substrate 212 may have substantially the same material and the same thickness, but aspects of the present invention are not limited thereto. In other embodiments, at least one of the adhesive layers 251, 252 and 253 may be formed using different materials and may have different thicknesses.

At least a portion of the first optical modulation layer 240 may be partially integrated with the third adhesive layer 253 formed on the bottom surface of the fourth substrate 214. In addition, an air gap layer may be defined between the first optical modulation layer 240 and the third adhesive layer 253 formed on the bottom surface of the fourth substrate 214.

Each of the first optical modulation layer 240 and the second optical modulation layer 250 may have a height in a range of 10 μm to 50 μm.

As described above, the first optical modulation layer 240 and the second optical modulation layer 250 may be positioned over the second substrate 212 to then be fixedly combined with the second substrate 212 by providing the other substrates 213 and 214 or the adhesive layers 251, 252 and 253 between the first optical modulation layer 240 and the second optical modulation layer 250 and the second substrate 212. Therefore, an integrated complex optical film can be provided Meanwhile, unlike in the illustrated embodiment, a prism pattern may be employed as the second optical modulation layer 250. In this case, the prism pattern as the second optical modulation layer 250 may extend in a direction perpendicular to a direction in which the prism pattern as the first optical modulation layer 240 extends. In addition, a microlens may also be employed as the first optical modulation layer 240.

In some embodiments, a renticular pattern may be employed to the first optical modulation layer 240 and/or the second optical modulation layer 250.

Pattern arrangements (or pattern extending directions) of the first optical modulation layer 240 and the pattern of the second optical modulation layer 250 may be tilted by a predetermined angle. The tilt angle may be in a range of, for example, 1 to 45°. In some embodiments, the tilt angle may be in a range of, for example, 3 to 6°. In some other embodiments, the tilt angle may be in a range of approximately 2 to approximately 3°.

The entire thickness of the complex optical film 200 may be in a range of approximately 300 μm to approximately 1000 μm. In an exemplary embodiment, the entire thickness of the complex optical film 200 may be approximately 600 μm.

As described above, in the complex optical film 200 and the light source assembly 10 according to some embodiments of the present invention, a high light-shielding characteristic and a high brightness characteristic can be effectively demonstrated simply using a single complex optical film 200 without using a diffusion plate.

In addition, since the light source assembly 10 uses only the single complex optical film 200 without using a diffusion plate, the assembling process may be simplified.

Further, since the light source assembly 10 uses only the single complex optical film 200 without using a diffusion plate or other optical sheets, there is no possibility of abrasion due to a contact between different kinds of sheets or plates. Accordingly, an issue of abrasion resistance is not encountered and the degree of freedom in selecting materials used can be increased.

Hereinafter, the present invention will be described in more detail through the following specific Preparation Examples and Experimental Examples.

Preparation Example 1

A composition for a shielding layer was prepared by mixing a binder resin including acryl, melanin organic beads having an average particle size of 5 μm and titanium dioxide fillers having an average particle size of 1 μm. A mixing ratio by weight of the binder resin, the melanin organic beads and the titanium dioxide fillers was 50:40:10.

The shielding layer composition was gravure-coated on one surface of a 125 μm thick first PET substrate. A thickness of the coating was approximately 10 μm. Thereafter, the coating was annealed at a temperature of 120° C. and the coating of the shielding layer composition was cured.

Next, a composition including acryl was transferred to the other surface of the first PET substrate using a mold for a diffusion pattern having concave parts and convex parts randomly formed. The composition was dried and cured by UV radiation, thereby forming a diffusion pattern layer. A maximum thickness of the diffusion pattern layer was 100 μm, and a maximum height difference between the concave part and the convex part was 60 μm.

Next, a 125 μm thick second PET substrate was prepared, and a 3 μm thick adhesive layer was coated on its one surface. Then, the diffusion pattern layer of the first PET substrate and the adhesive layer of the second PET substrate were placed to face each other, followed by pressing to allow the convex parts of the diffusion pattern layer partially penetrate into the adhesive layer, thereby combining the diffusion pattern layer and the adhesive layer with each other.

Next, a 125 μm thick third PET substrate and a 125 μm thick fourth PET substrate were prepared. A prism layer was formed on one surface of the third PET substrate. In addition, a microlens layer was formed on one surface of the fourth PET substrate and a 3 μm thick adhesive layer was coated on the other surface of the fourth PET substrate. Then, the prism layer of the third PET substrate and the adhesive layer of the fourth PET substrate were placed to face each other, followed by pressing to allow ridged parts of the prism layer partially penetrate into the adhesive layer, thereby combining the prism layer and the adhesive layer with each other. Then, a 30 μm thick adhesive layer was coated on the other surface of the third PET substrate, and the second PET substrate and the fourth PET substrate were placed such that the other surface of the second substrate and the adhesive layer of the third PET substrate face each other, followed by combining the second substrate and the third PET substrate with each other, thereby fabricating a complex optical film including four PET substrates integrated as a single body.

Preparation Example 2

A complex optical film was prepared in the same manner as in Preparation Example 1, except that a microlens layer having an average height of 20 μm was formed on the other surface of a first PET substrate.

Comparative Example 1

A complex optical film was prepared in the same manner as in Preparation Example 1, except that a mat layer, instead of a light shielding layer, was formed on one surface of a first PET substrate. The mat layer was formed by gravure-coating a composition including a binder resin and melanin organic beads mixed in a weight ratio of 50:50, followed by thermally curing.

Comparative Example 2

A 125 μm thick third PET substrate and a 125 μm thick fourth PET substrate were prepared. A prism layer was formed on one surface of the third PET substrate. In addition, a microlens layer was formed on one surface of the 125 μm thick fourth PET substrate and a 3 μm adhesive layer was coated on the other surface of the fourth PET substrate. Next, the third PET substrate and the fourth PET substrate were placed such that the prism layer of the third PET substrate and the adhesive layer of the fourth PET substrate face each other, followed by pressing to allow ridged parts of the prism layer to partially penetrate into the adhesive layer, thereby combining the third PET substrate and the fourth PET substrate with each other.

Here, a 1500 μm thick foam diffusion plate was also prepared.

Experimental Example 1

Measurement of Thicknesses

Thicknesses of complex optical films prepared in Preparation Example 1-2 and Comparative Example 1-2 were measured. In Comparative Example 2, combined optical sheets were placed directly on a foam diffusion plate and the overall thicknesses of the combined optical sheets were measured. The measurement results are shown in Table 1.

TABLE 1

|  | Preparation Example 1 | Preparation Example 2 | Comparative Example 1 | Comparative Example 2 |
|---|---|---|---|---|
| Thickness (Unit: μm) | 620 | 600 | 620 | 1805 |

Experimental Example 2

Measurement of Light Shielding Characteristic and Optical Properties

An LED light source was placed and the complex optical film prepared in Preparation Example 1 was installed thereon. A light shielding pattern of the complex optical film was allowed to face the LED light source, such that a distance between the LED light source and the complex optical film was approximately 2 cm. Then, total transmittance (TT), haze and brightness were measured on a top portion of the complex optical film.

Total transmittance, haze and brightness were measured on the complex optical films prepared in Preparation Example 2, Comparative Example 1 and Comparative Example 2 in the same manner as in Preparation Example 1. In Comparative Example 2, a foam diffusion plate was installed on an LED light source, and combined optical sheets were placed thereon. In Comparative Example 2, a distance between the LED light source and the foam diffusion plate was approximately 2 cm and the combined optical sheets were placed to directly contact the foam diffusion plate.

In addition, total transmittance, haze and brightness were measured in the same manner as in a case where a foam diffusion plate was installed alone.

The measurement results are shown in Table 2.

TABLE 2

|  | Preparation Example 1 | Preparation Example 2 | Comparative Example 1 | Comparative Example 2 | Foam diffusion plate |
|---|---|---|---|---|---|
| TT (Unit: %) | 59.89 | 59.86 | 65.42 | 56.68 | 58.12 |
| Haze (Unit: %) | 98.31 | 98.29 | 97.10 | 98.23 | 98.12 |
| Brightness (Unit: Nit) | 3560 | 3553 | 3220 | 3472 | 2188 |

In addition, a plurality of fluorescent lamps were arranged and the complex optical films prepared in Preparation Example 1, Preparation Example 2 and Comparative Example 1 were equidistantly placed thereon to observe light shielding characteristics.

Figure 13:
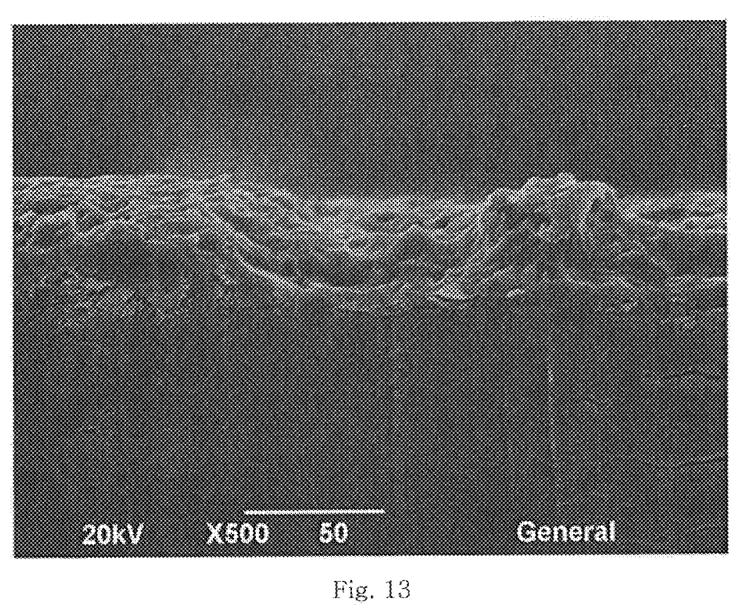
FIGS. 13, 14 and 15 are photographs showing investigation results of light shielding characteristics in Preparation Examples 1 and 2 and Comparative Example 1.
Figure 14:
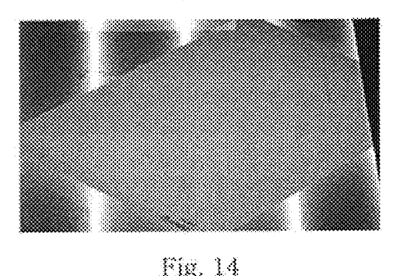
Figure 15:
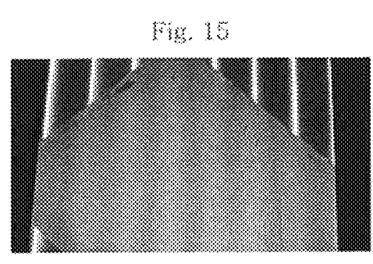

FIGS. 13, 14 and 15 are photographs showing investigation results of light shielding characteristics in Preparation Examples 1 and 2 and Comparative Example 1.

Referring to FIGS. 13 to 15, in Preparation Example 1, a considerably high light shielding characteristic was demonstrated by substantially shielding bright portions of underlying fluorescent lamps. In Comparative Example 1, however, there was a relatively clear distinction between bright portions and dark portions of underlying fluorescent lamps, suggesting that a relatively low light shielding characteristic was demonstrated in Comparative Example 1. In addition, the light shielding characteristic demonstrated in Preparation Example 2 was lower than in Preparation Example 1 and higher than in Comparative Example 1.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A complex optical film comprising:
   a first substrate;
   a light shielding layer formed on a bottom surface of the first substrate;
   an optical pattern layer formed on a top surface of the first substrate and including concavo-convex portions;
   a second substrate disposed on the first substrate; and
   a first adhesive layer disposed under the second substrate,
   wherein the light shielding layer includes a binder and organic particles and inorganic particles dispersed in the binder, the convex portions of the optical pattern layer at least partially penetrate into the first adhesive layer to be combined with the first adhesive layer, and a low-refraction area having a lower refractive index than the optical pattern layer and the first adhesive layer is defined between the first adhesive layer and the optical pattern layer,
   wherein surface roughness of the optical pattern layer is larger than that of the light shielding layer.

2. The complex optical film of claim 1, wherein the optical pattern layer is shapeless.

3. The complex optical film of claim 1, wherein the low-refraction area is an air gap layer.

4. The complex optical film of claim 3, wherein the air gap layer has a maximum thickness in a range of 5 μm to 100 μm.

5. The complex optical film of claim 1, wherein the light shielding layer has a non-planar surface.

6. The complex optical film of claim 1, wherein the optical pattern layer is a diffusion pattern layer.

7. The complex optical film of claim 1, further comprising at least one optical modulation layer formed on the second substrate, wherein the at least one optical modulation layer is at least one selected from the group consisting of a prism layer, a microlens layer, a diffusion pattern layer, and a renticular layer, and the at least one optical modulation layer is fixedly combined with the second substrate.

8. The complex optical film of claim 1, further comprising:
a third substrate disposed on the second substrate; and
a second adhesive layer interposed between the second substrate and the third substrate and binding the second substrate with the third substrate.

9. The complex optical film of claim 1, further comprising:
a first optical modulation layer disposed on a top surface of the second substrate;
a third substrate disposed on the second substrate;
substrate;
a second optical modulation layer disposed on a top surface of the third substrate; and
a second adhesive layer formed on a bottom surface of the third substrate and having the first optical modulation layer at least partially bonded thereto.

10. A complex optical film, comprising:
a first substrate;
a light shielding layer formed on a bottom surface of the first substrate;
an optical pattern layer formed on a top surface of the first substrate and including concavo-convex portions;
a second substrate disposed on the first substrate;
a first adhesive layer disposed under the second substrate;
a third substrate disposed on the second substrate; and
a second adhesive layer interposed between the second substrate and the third substrate and binding the second substrate with the third substrate,
wherein the light shielding layer includes a binder and organic particles and inorganic particles dispersed in the binder, the convex portions of the optical pattern layer at least partially penetrate into the first adhesive layer to be combined with the first adhesive layer, and a low-refraction area having a lower refractive index than the optical pattern layer and the first adhesive layer is defined between the first adhesive layer and the optical pattern layer,
wherein the second adhesive layer has a thickness smaller than the first adhesive layer.

11. The complex optical film of claim 8, further comprising:
a fourth substrate disposed on the third substrate;
a first optical modulation layer formed on a top surface of the third substrate;
a second optical modulation layer formed on a top surface of the fourth substrate; and
a third adhesive layer formed on a bottom surface of the fourth substrate and having the first optical modulation layer at least partially bonded thereto.

12. The complex optical film of claim 11, wherein the first optical modulation layer is a prism layer and the second optical modulation layer is a microlens layer.

13. A light source assembly comprising:
a receiving container;
at least one light source received in the receiving container; and
a complex optical film received in the receiving container and spaced apart from a top portion of the light source,
the complex optical film comprising a first substrate,
a light shielding layer formed on a bottom surface of the first substrate,
an optical pattern layer formed on a top surface of the first substrate and including concavo-convex portions,
a second substrate disposed on the first substrate, and
a first adhesive layer disposed under the second substrate,
wherein the light shielding layer includes a binder and organic particles and inorganic particles dispersed in the binder, the convex portions of the optical pattern layer at least partially penetrate into the first adhesive layer to be combined with the first adhesive layer, and a low-refraction area having a lower refractive index than the optical pattern layer and the first adhesive layer is defined between the first adhesive layer and the optical pattern layer,
wherein surface roughness of the optical pattern layer is larger than that of the light shielding layer.

14. The light source assembly of claim 13, wherein the at least one light source directly faces the complex optical film with an air gap layer intervening between the at least one light source and the complex optical film.

15. The light source assembly of claim 13, wherein the light shielding layer has a non-planar surface.

16. The light source assembly of claim 13, wherein the optical pattern layer is a diffusion pattern layer.

17. The light source assembly of claim 13, further comprising:
a third substrate disposed on the second substrate; and
a second adhesive layer interposed between the second substrate and the third substrate and binding the second substrate with the third substrate.

* * * * *